United States Patent
Geisinger

(10) Patent No.: US 8,112,744 B2
(45) Date of Patent: *Feb. 7, 2012

(54) METHOD AND SYSTEM FOR CREATING SELF-ASSEMBLING COMPONENTS THROUGH COMPONENT LANGUAGES

(75) Inventor: Nile Josiah Geisinger, San Pablo, CA (US)

(73) Assignee: dLoo, Inc., Alameda, CA (US)

( * ) Notice: Subject to any disclaimer, the term of this patent is extended or adjusted under 35 U.S.C. 154(b) by 1063 days.

This patent is subject to a terminal disclaimer.

(21) Appl. No.: 12/013,319

(22) Filed: Jan. 11, 2008

(65) Prior Publication Data

US 2008/0134141 A1 Jun. 5, 2008

Related U.S. Application Data

(63) Continuation of application No. 10/310,098, filed on Dec. 4, 2002, now Pat. No. 7,343,596.

(60) Provisional application No. 60/365,963, filed on Mar. 19, 2002.

(51) Int. Cl.
G06F 9/45 (2006.01)
(52) U.S. Cl. ............ 717/143; 717/108; 717/112
(58) Field of Classification Search .......... None
See application file for complete search history.

(56) References Cited

U.S. PATENT DOCUMENTS

| | | | |
|---|---|---|---|
| 5,361,355 A | 11/1994 | Kondo | |
| 5,450,583 A | 9/1995 | Inada | |
| 5,475,817 A | 12/1995 | Waldo | |
| 5,632,022 A | 5/1997 | Warren | |
| 5,659,735 A | 8/1997 | Parrish | |
| 5,842,220 A | 11/1998 | De Groot | |
| 5,920,868 A | 7/1999 | Fowlow | |
| 5,950,011 A | 9/1999 | Albrecht | |
| 6,209,125 B1 | 3/2001 | Hamilton | |
| 6,226,792 B1 | 5/2001 | Goiffon et al. | |
| 6,269,377 B1 | 7/2001 | Collie | |
| 6,314,558 B1 | 11/2001 | Angel | |
| 6,367,068 B1 | 4/2002 | Vaidyanathan | |
| 6,473,893 B1 | 10/2002 | Kay | |
| 6,560,774 B1 | 5/2003 | Gordon | |
| 6,925,636 B2 | 8/2005 | Haugen | |

(Continued)

OTHER PUBLICATIONS

Nile Geisinger, "Method and System for Creating Programs Using Cope: Having Coupled Syntactic and Semantic Relationships", pp. 1-40.

Nile Geisinger, "Method and System for Creating Distributed Computer Languages", pp. 1-26.

(Continued)

*Primary Examiner* — Tuan Dam
*Assistant Examiner* — Isaac Tecklu
(74) *Attorney, Agent, or Firm* — Blakely Sokoloff Taylor & Zafman LLP

(57) ABSTRACT

A system for self-assembling software components is described herein. In one embodiment, a system includes a first and second set of language components, where each language component defines at least one part of language runnable on a computer by associating a piece of grammar of the language with at least one software component that implements the piece of grammar. The system further includes a request broker that upon being provided with a section of code written in the language matches syntactic appearances of the first set of language components in the section of code and granting logic to grant access to the language components of the first set whose syntactic appearances the request broker matched, in order to enable self-assemblage of the language components of the first set with language components of the second set.

19 Claims, 14 Drawing Sheets

U.S. PATENT DOCUMENTS

| | | |
|---|---|---|
| 7,017,146 B2 | 3/2006 | Dellarocas |
| 2002/0165993 A1 | 11/2002 | Kramer |
| 2003/0028564 A1 | 2/2003 | Sanfilippo |
| 2004/0031015 A1 | 2/2004 | Ben-Romdhane |
| 2004/0181390 A1 | 9/2004 | Manson |
| 2005/0229154 A1 | 10/2005 | Hiew |

OTHER PUBLICATIONS

Daniel E. Ford, "System and Method for Accessing Software Components in a Distributed Network Environment", Aug. 8, 2002, pp. 1-6.

METHOD AND SYSTEM FOR CREATING SELF-ASSEMBLING COMPONENTS THROUGH COMPONENT LANGUAGES

RELATED APPLICATIONS

This application is a continuation application of U.S. patent application Ser. No. 10/310,098, filed Dec. 4, 2002, now U.S. Pat. No. 7,343,596, which claims the priority of U.S. Provisional Application No. 60/365,963, filed Mar. 19, 2002, the disclosure of which is incorporated by reference herein in its entirety.

FIELD OF THE INVENTION

The present invention relates generally to a method and system for creating reusable software components. More specifically, the present invention relates to creating software components that enable automatic search and discovery.

BACKGROUND

Software component technologies, like CORBA and J2EE, provide software building blocks that allow developers to easily share and reuse code. Software components increase the reusability of software by enforcing usage through well-defined interfaces that, in their most common implementations, are automatically generated by vendor supplied tools. The CORBA standard, for example, defines interfaces in the Interface Definition Language (IDL) and the resulting definition creates a contract between the producer of the CORBA component and its consumer. The use of well-defined interfaces, coupled with technologies that provide introspection and other services, enforces good design and increases the reusability of software as a whole.

In addition to traditional software component technologies, networked software component technologies improve on the state of the art by making it possible to reuse software components over a network. Using network software tools, client and server code can be automatically generated from the interfaces of components. The resulting client code contains code to marshall calls made to the client class to the server class. The resulting server class contains both the implementation of the component and code to translate calls received from the client code to the corresponding calls in the implementation of the component. In this way, networked components allow client programs to call code that may be located on other machines in the network as if it was located on the local computer. This enables a distributed form of development in which producers of components publish components on a network and consumers reuse them to build applications.

Despite the advantages of networked components, networked component technology have not yet been widely adopted. The development of components can only be distributed to the degree that component technology can automatically locate a component that both performs the desired functionality and has an interface that a client can use. The CORBA and the J2EE specifications attempt to solve the problem by providing a naming service that can be used to look for a component by specifying its name and its method signature. Other technologies from companies like Hewlett Packard and organizations like the W3C allow programmers to specify the inheritance details of a component or its attributes. None of these methods, which are described in more detail in the prior art, have enabled the automatic reuse of software envisioned in the early days of computer science.

The prior art includes three distinct classes of inventions for finding components on a network. In the first class, a component reference work is created. In this approach, the component reference work might be an encyclopedia, a source list, a knowledge base, a database management system, or a catalog. In the second class, the search is facilitated by analyzing the components or information distributed with the components. This is done through the use of an information class that is distributed with the component, using keywords to analyze the components, or domain knowledge that looks at interrelationships between different software components. In the third and final class, the search is facilitated by specifying attributes or methods of the desired component.

The shortcoming of all of these approaches is that there is no guarantee that the component that is found will perform the action, have the methods, or contain the attributes the client is expecting. This shortcoming arises from the fact that the names of classes, methods, and attributes are not strictly tied to their definitions in object-oriented programming. As a result, the provider of a component has to guess the names of the class, methods, and attributes that the programmer writing the client program will want. The programmer writing the client program, in turn, has to guess the names that the provider of the component choose when implementing the component. Because this mutual guessing game seldom succeeds, most programmers who want to reuse a component have to manually lookup the names the producer has chosen for the class, its methods, and attributes.

The requirement for human intervention limits the utility of distributed components since it requires a manual process every time a software component is reused. The present invention enables the automatic assemblage of network components without human intervention through the cohesion of semantics and syntax. This cohesion guarantees that both the producer and consumer of a software component will agree on the names of the component, its properties, and behavior without any prior communication. This increases the reusability of software as a whole and enables disjoint groups of developers to collaborate in a distributed manner without needing to communicate with each other.

SUMMARY OF THE DESCRIPTION

A system for self-assembling software components is described herein. In one embodiment of the invention, a system includes a first and second set of language components, where each language component defines at least one part of at least one language runnable on a computer by associating a piece of grammar of the at least one language with at least one software component that implements the piece of grammar. The system further includes a request broker that upon being provided with at least one section of code written in the at least one language matches syntactic appearances of the first set of language components in the at least one section of code and granting logic to grant access to the language components of the first set whose syntactic appearances the request broker matched, in order to enable self-assemblage of the language components of the first set with language components of the second set.

Other features of the present invention will be apparent from the accompanying drawings and from the detailed description which follows.

BRIEF DESCRIPTION OF THE DRAWINGS

The accompanying drawings, which are incorporated in and form a part of this specification, illustrate embodiments of the invention and, together with the description, serve to explain the principles of the invention, wherein.

DETAILED DESCRIPTION

Preface. In this section, we present a detailed description of the invention, including examples from the drawings. While the description of the invention will be presented here, it will be understood that this description is not intended to limit the invention. On the contrary, the invention presented here is intended to cover alternatives, modifications, and equivalents, which may be included within the spirit and the scope of the invention as defined in the claims.

Definitions. The term bidirectional relationship is defined for the purposes of the embodiment presented here as a relationship between two elements of code across a codebase, such that, given the properties of one element of code in the codebase, the location of the other element in the codebase can be determined. In object-oriented programming, for example, programmers can find the data used by a method by looking in the method's class and can find the methods that use a piece of data by looking in the data's class.

The term cohered is defined for the purposes of the embodiment presented here as two elements of code that are in a bidirectional relationship. By this definition, data and methods are cohered in object-oriented programming. In the embodiment presented here, the Syntactic Definition (300) and the Semantic Definition (600) are cohered in the Language Component (700).

Figure 8:
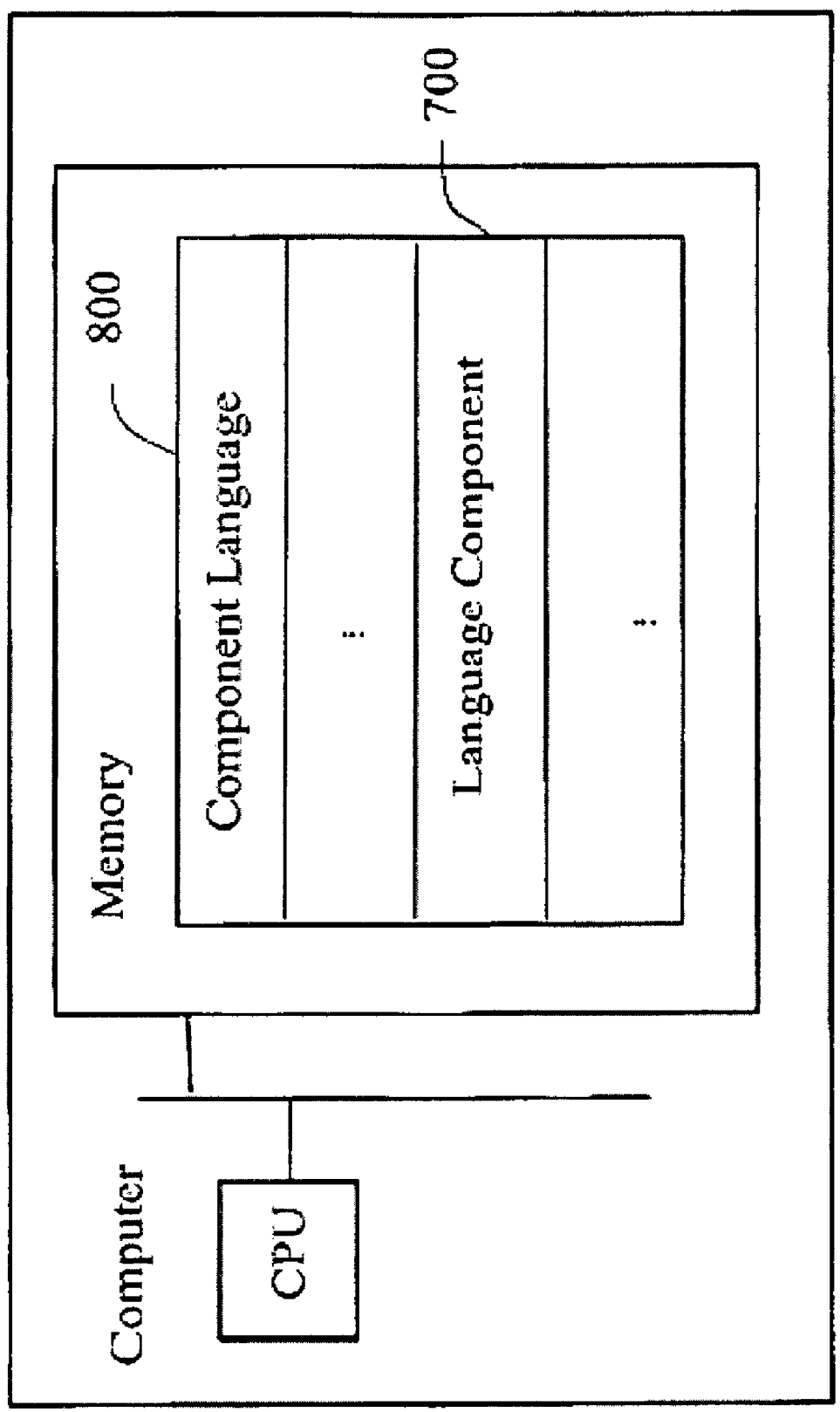
FIG. 8. is a block diagram of a computer system incorporating an embodiment of a Component Language.
Figure 9:
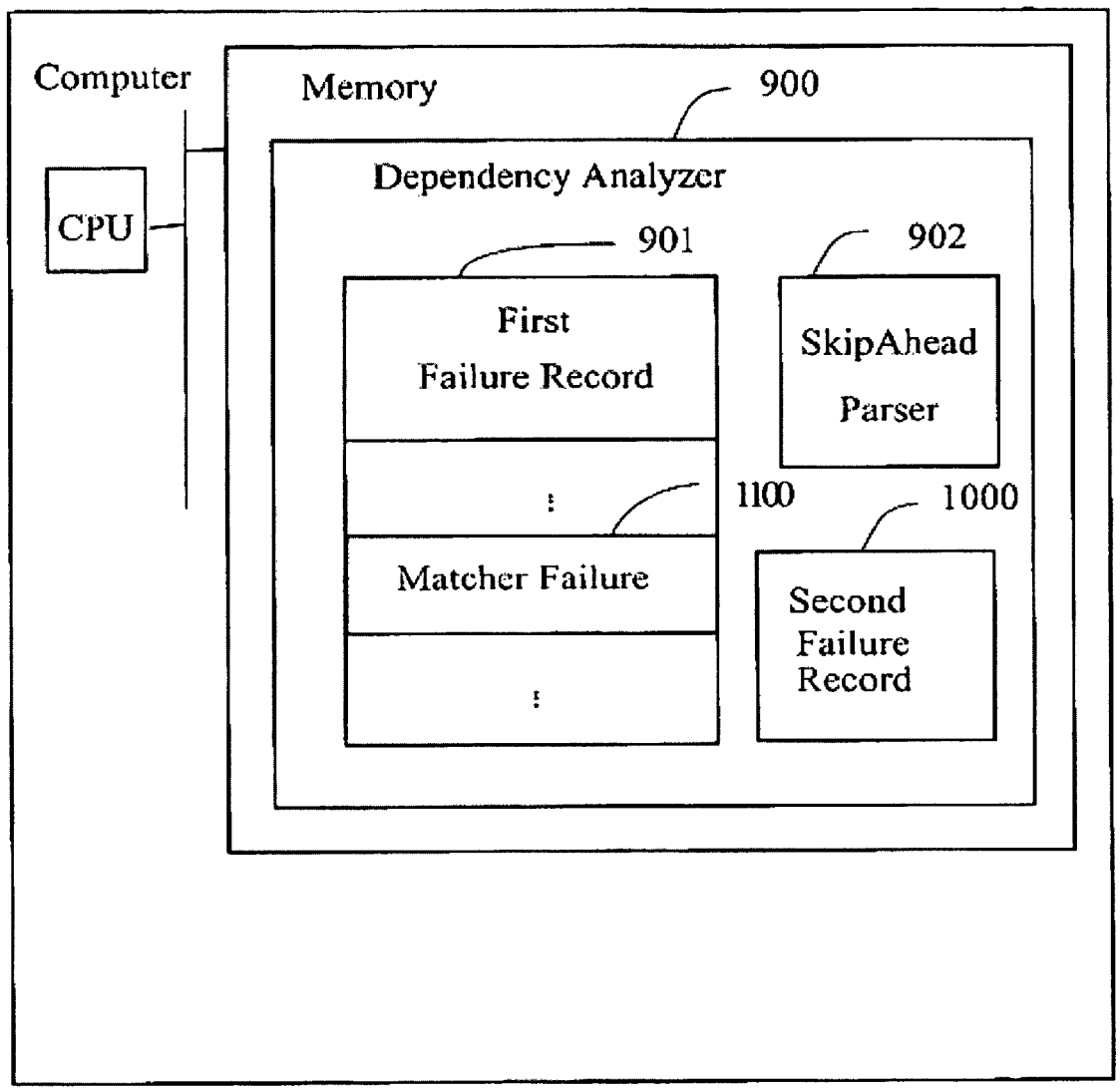
FIG. 9. is a block diagram of a computer system incorporating an embodiment of a Dependency Analyzer.
Figure 10:
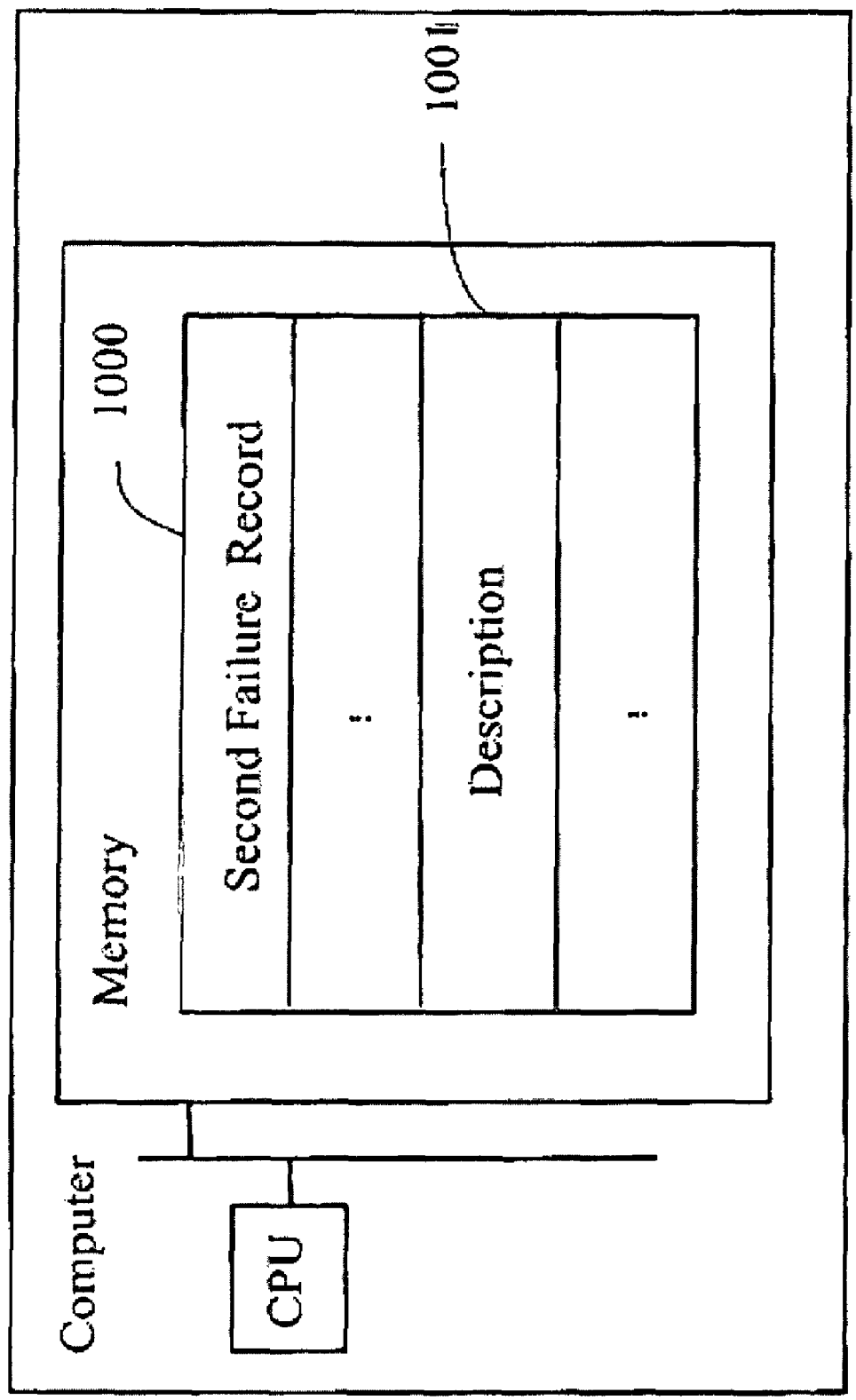
FIG. 10. is a block diagram of a computer system incorporating an embodiment of a Second Failure Record.
Figure 11:
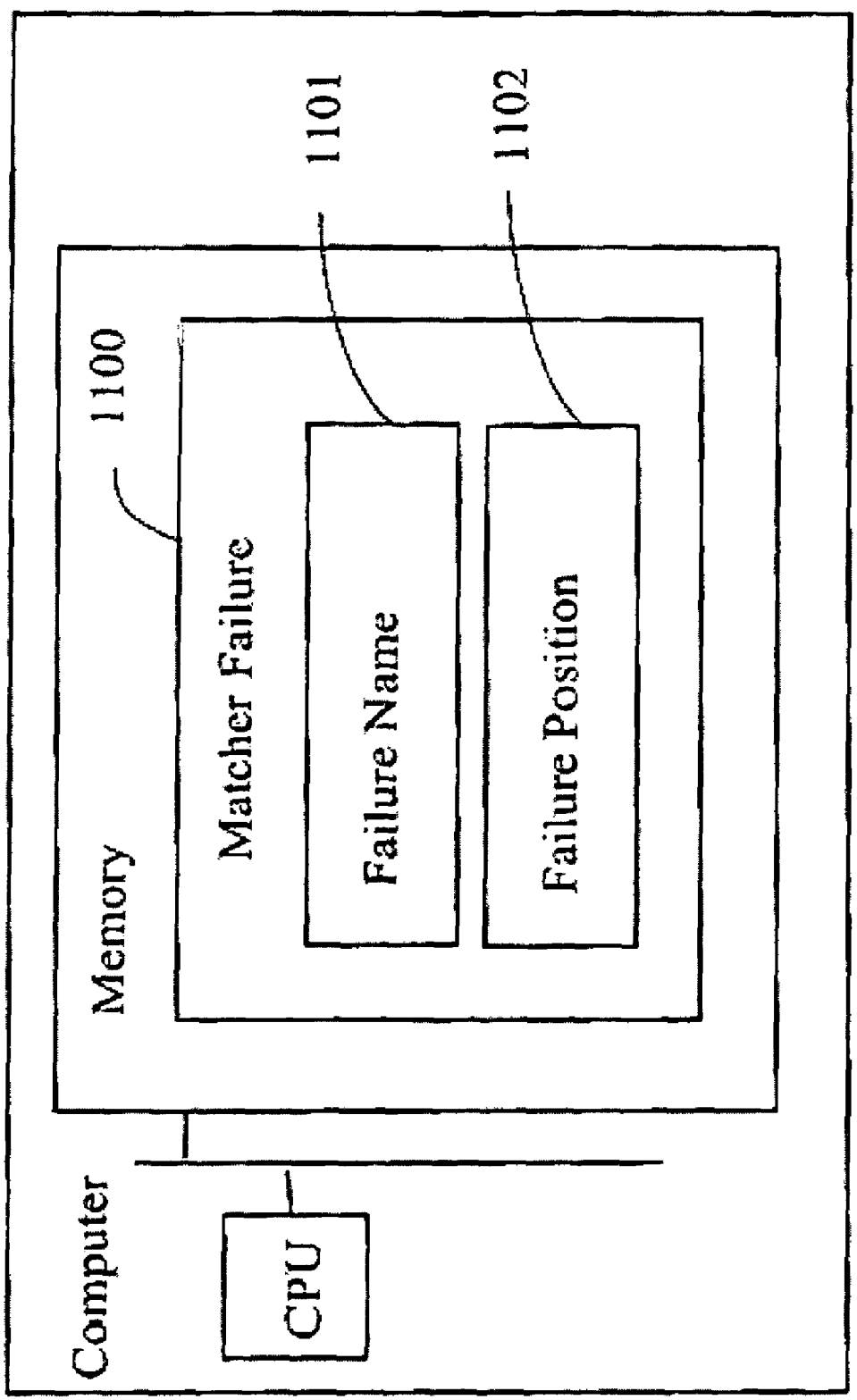
FIG. 11. is a block diagram of a computer system incorporating an embodiment of a Matcher Failure.
Figure 12:
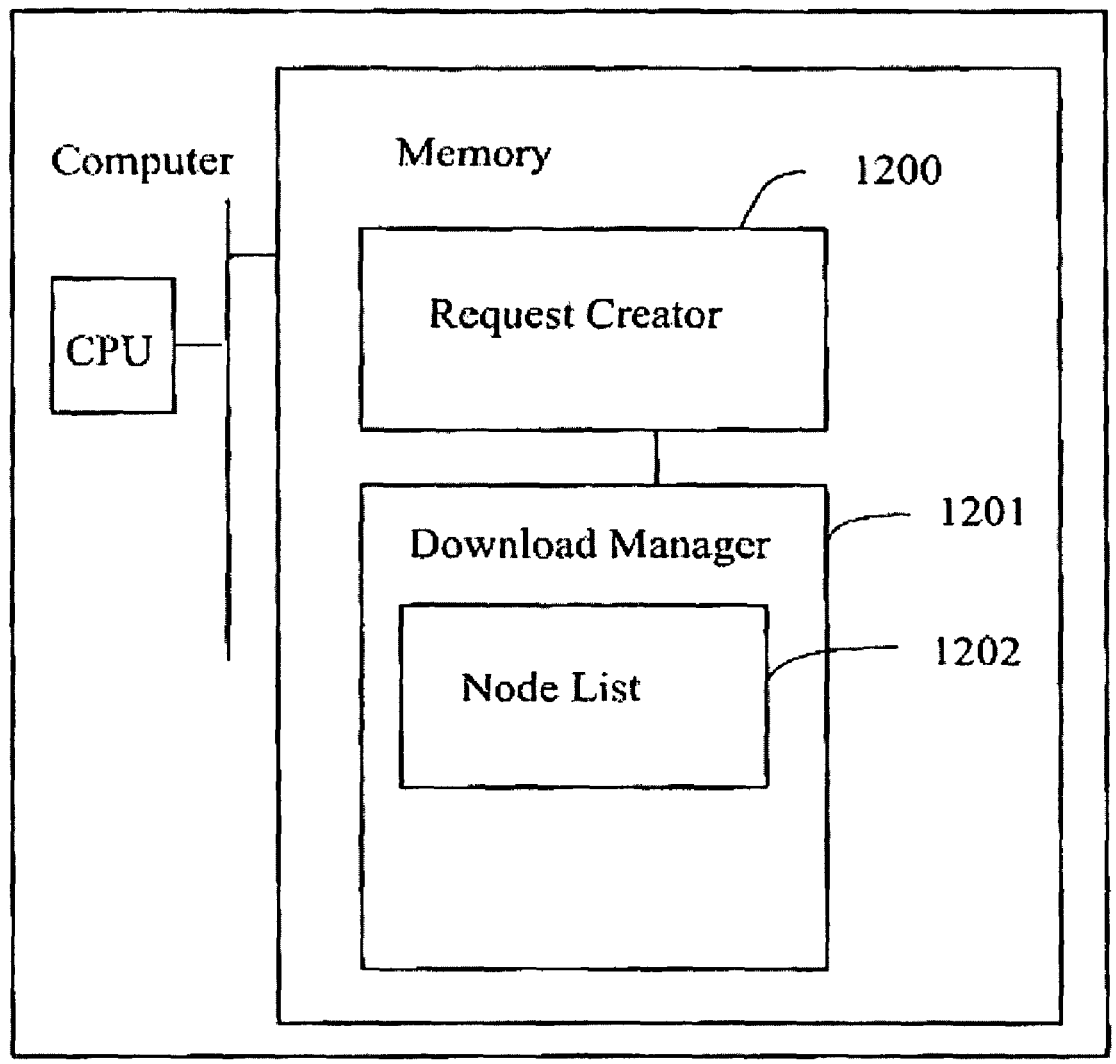
FIG. 12. is a block diagram of a computer system incorporating an embodiment of a Request Creator and Download Manager.
Figure 13:
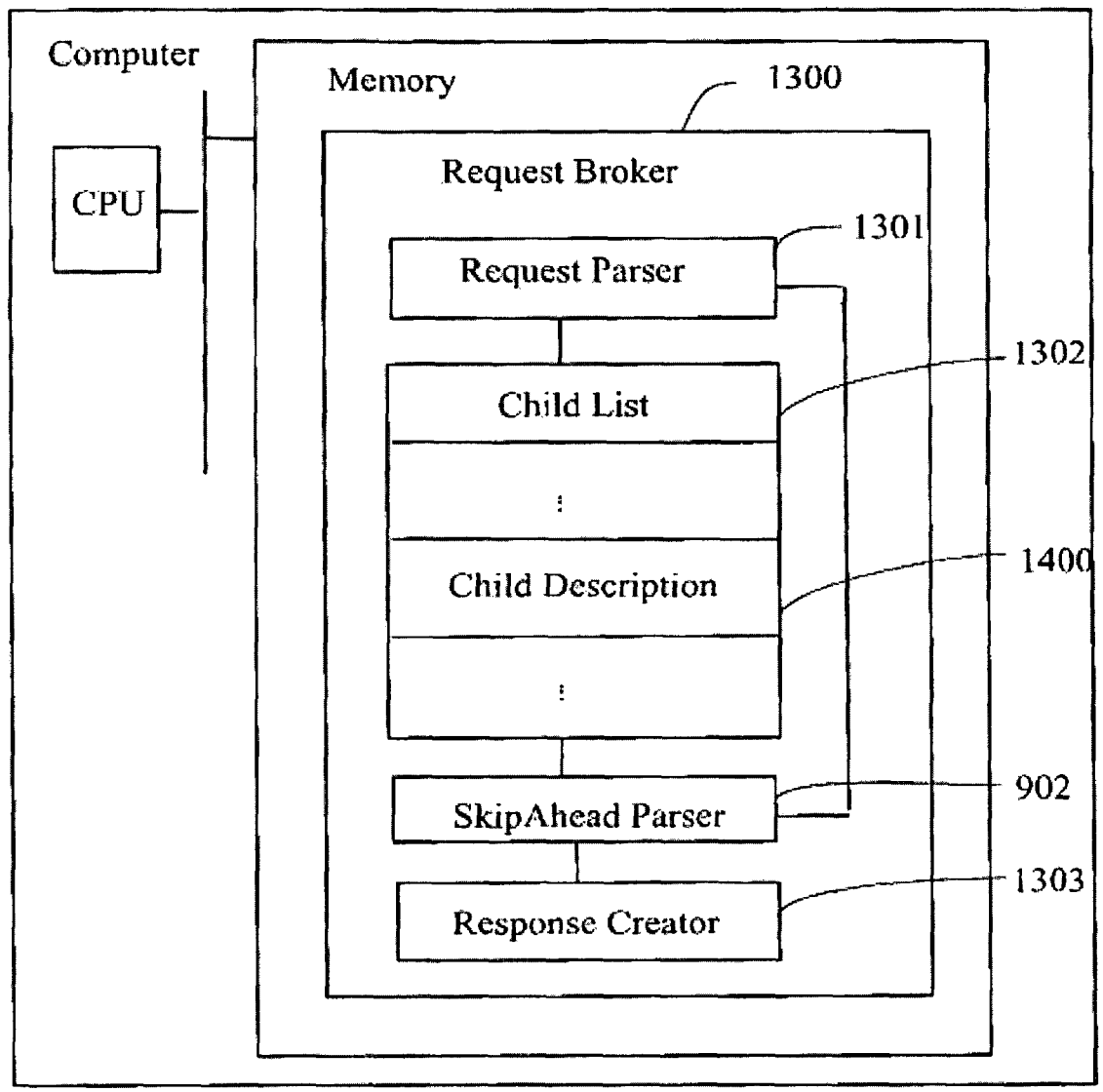
FIG. 13. is a block diagram of a computer system incorporating an embodiment of a Request Broker.
Figure 14:
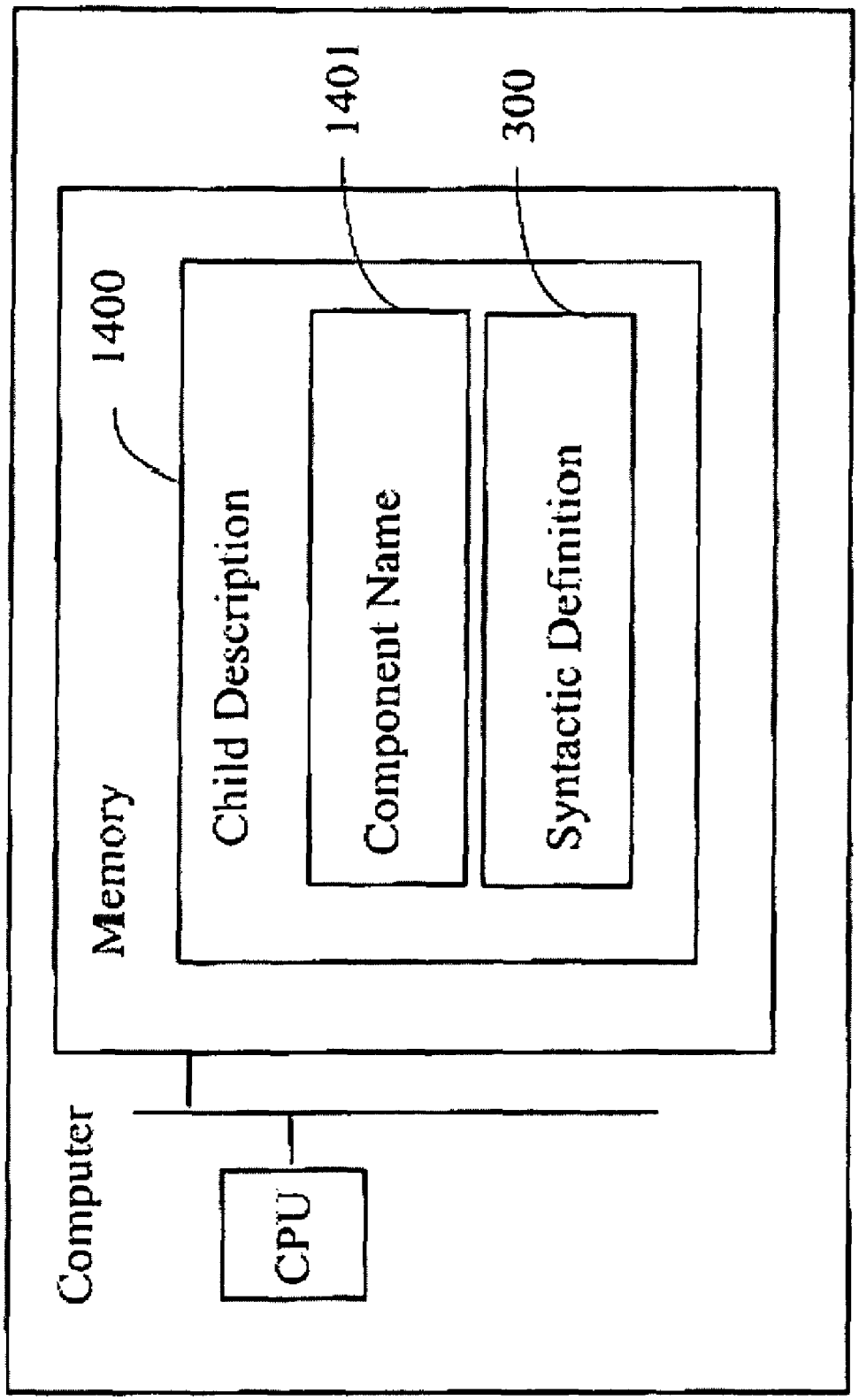
FIG. 14. is a block diagram of a computer system incorporating an embodiment of a Child Description.

The term component language is defined for the purposes of the embodiment presented here as a computer language such that each language element is associated with one or more software components that defines them. In a chemistry component language, for example, text like "H" or "Cl" would be associated with a Hydrogen and Chlorine components respectively and higher-level elements of the language like Atom and Molecule would be associated with Atom and Molecule components. One embodiment of a component language can be seen in FIG. 8.

Figure 2:
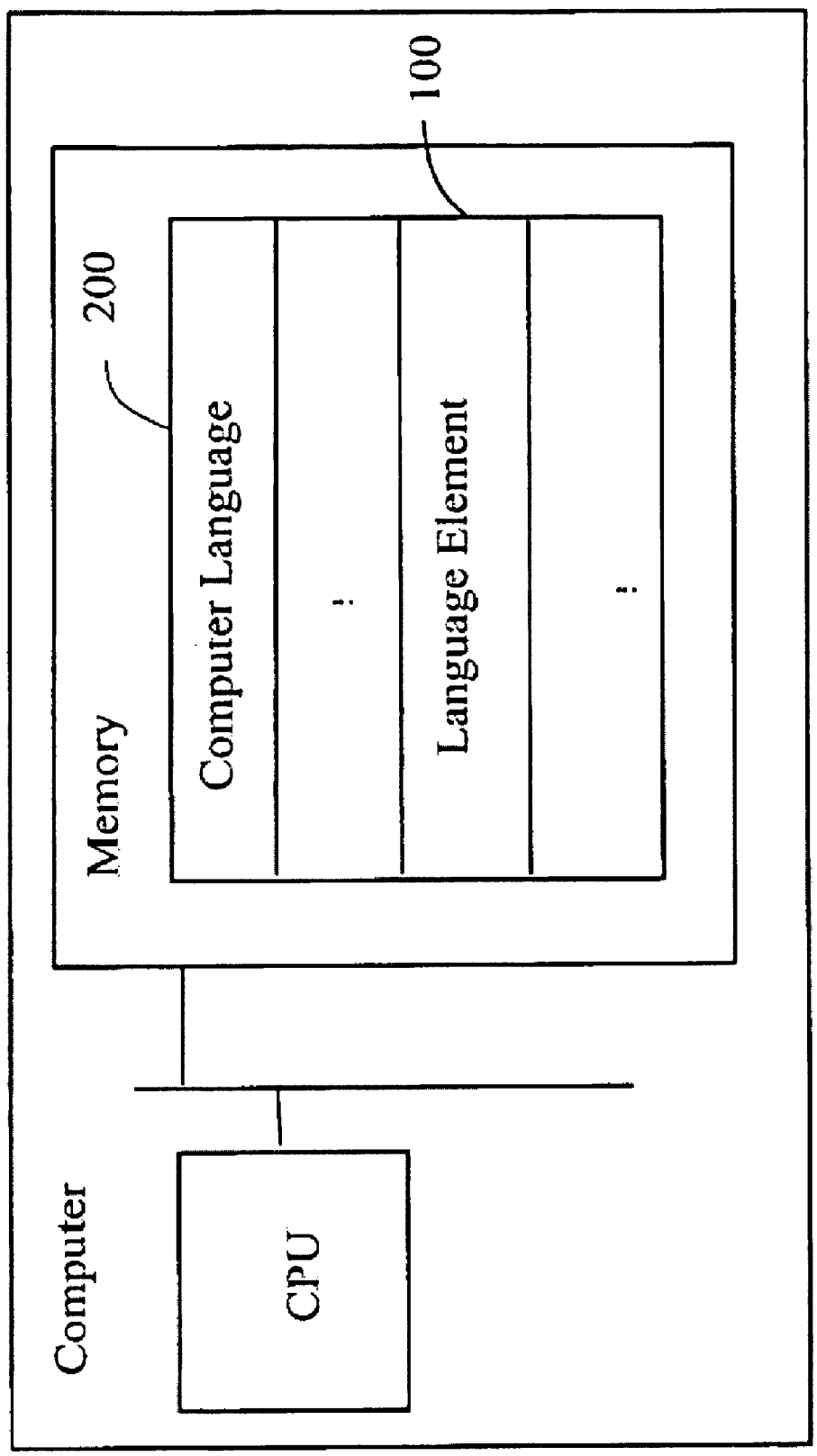
FIG. 2 is a block diagram of a computer system incorporating an embodiment of a Computer Language.
Figure 3:
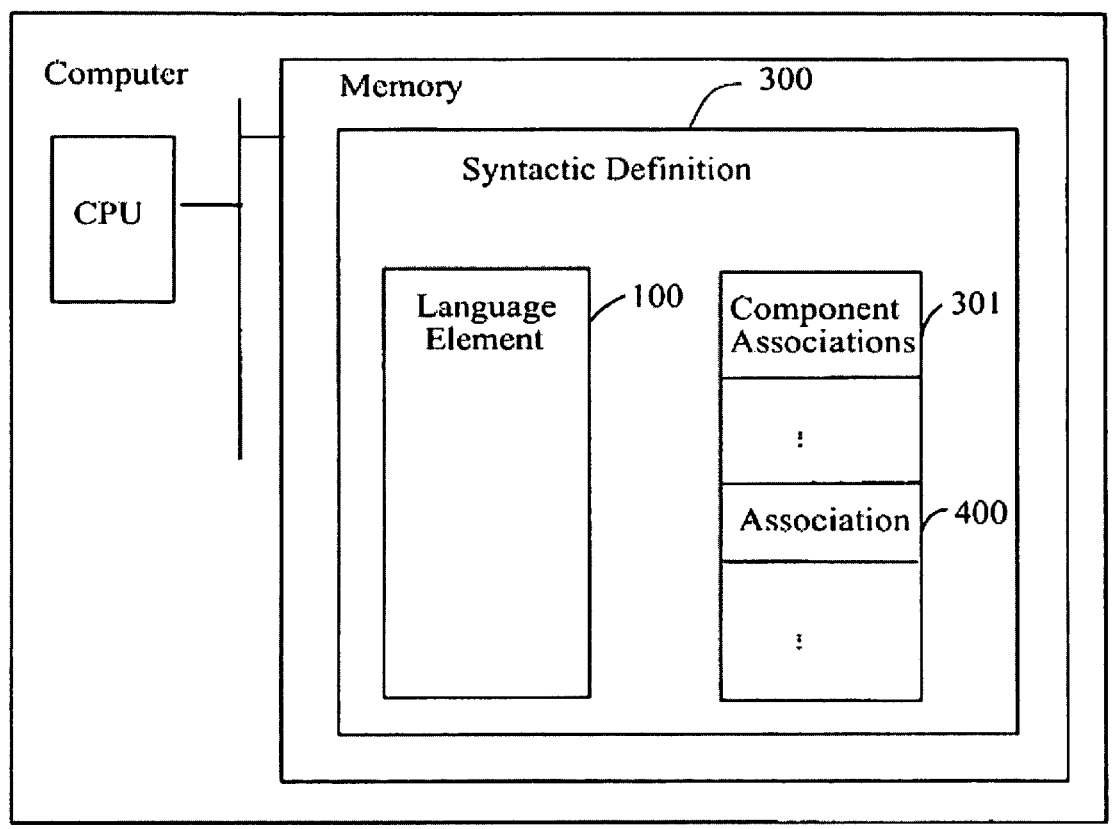
FIG. 3 is a block diagram of a computer system incorporating an embodiment of a Syntactic Definition.
Figure 4:
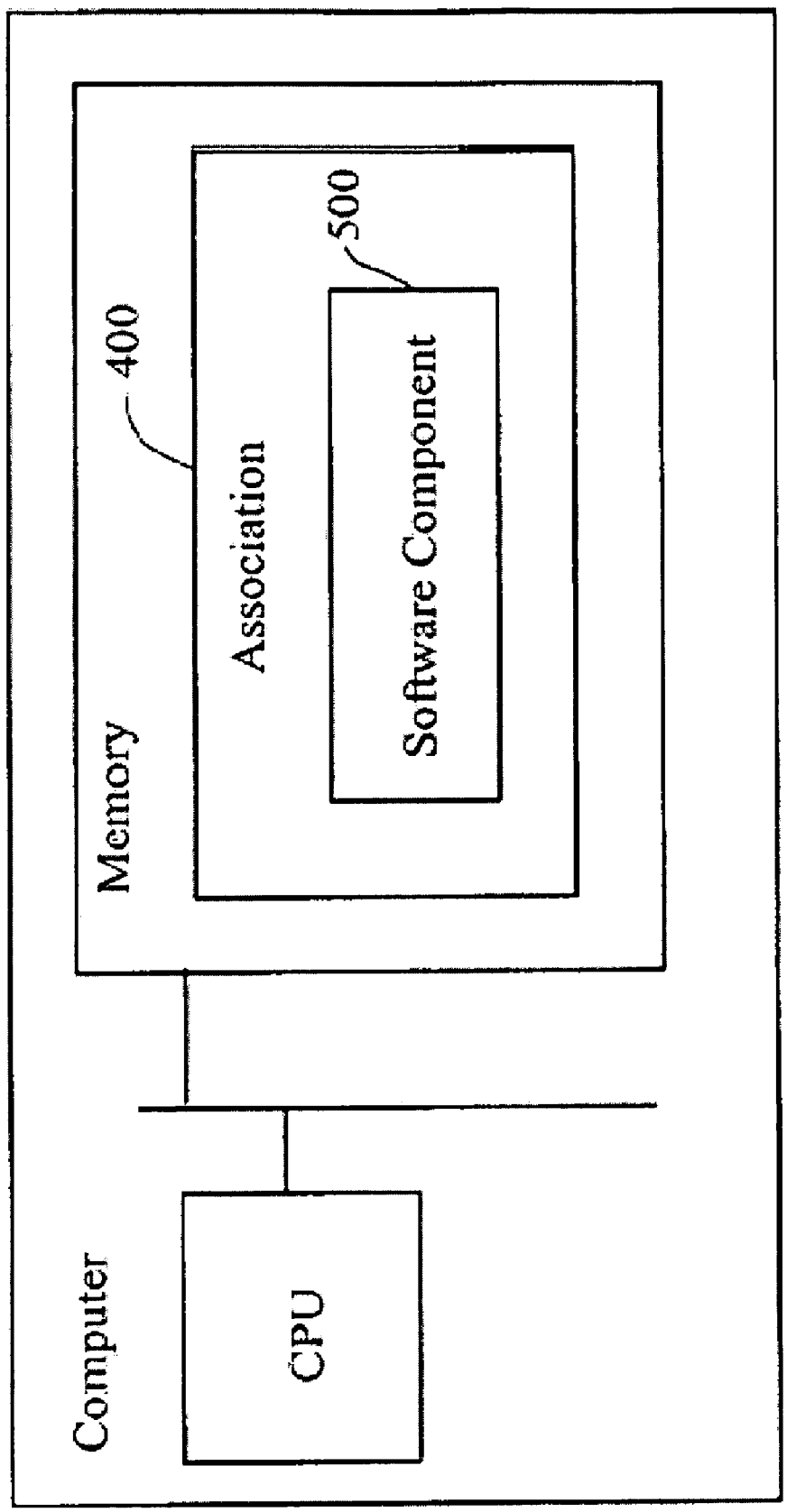
FIG. 4. is a block diagram of a computer system incorporating an embodiment of an Association.

The term computer language is defined for the purposes of the embodiment presented here as a program that implements the syntax of a language. Traditionally, a computer programmer defines a computer language by hand or uses any of a wide range of tools to translate a description of the computer language from BNF, EBNF, or another meta-language to computer code. In the later case, the meta-languages define languages as a collection of language elements. One embodiment of a computer language can be seen in FIG. 2.

The term dependency is defined for the purposes of the embodiment presented here as a segment of code that a program needs in order to run or build. Programs may have one or multiple dependencies depending on their complexity. In Unix applications, the standard C library is frequently a dependency and, in Windows applications, the Microsoft Foundation Classes are frequently dependencies.

The term inheritance is well known in the field of software and should be understood and construed broadly for the purposes of the embodiment presented here. In addition to the standard inheritance of methods and data elements, the term may also refer to the inheritance of syntactic and semantic relationships.

Figure 5:
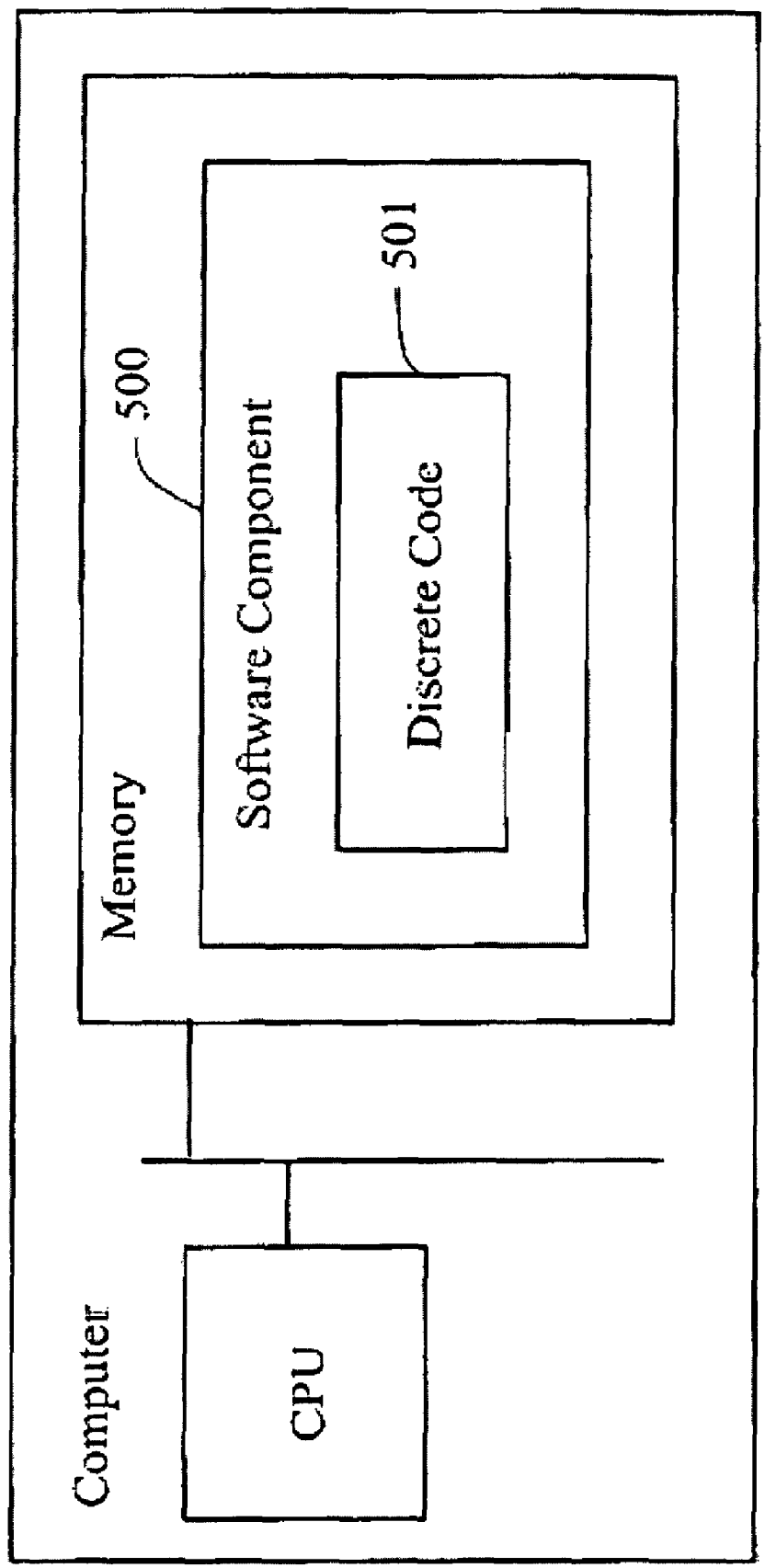
FIG. 5. is a block diagram of a computer system incorporating an embodiment of a Software Component.
Figure 6:
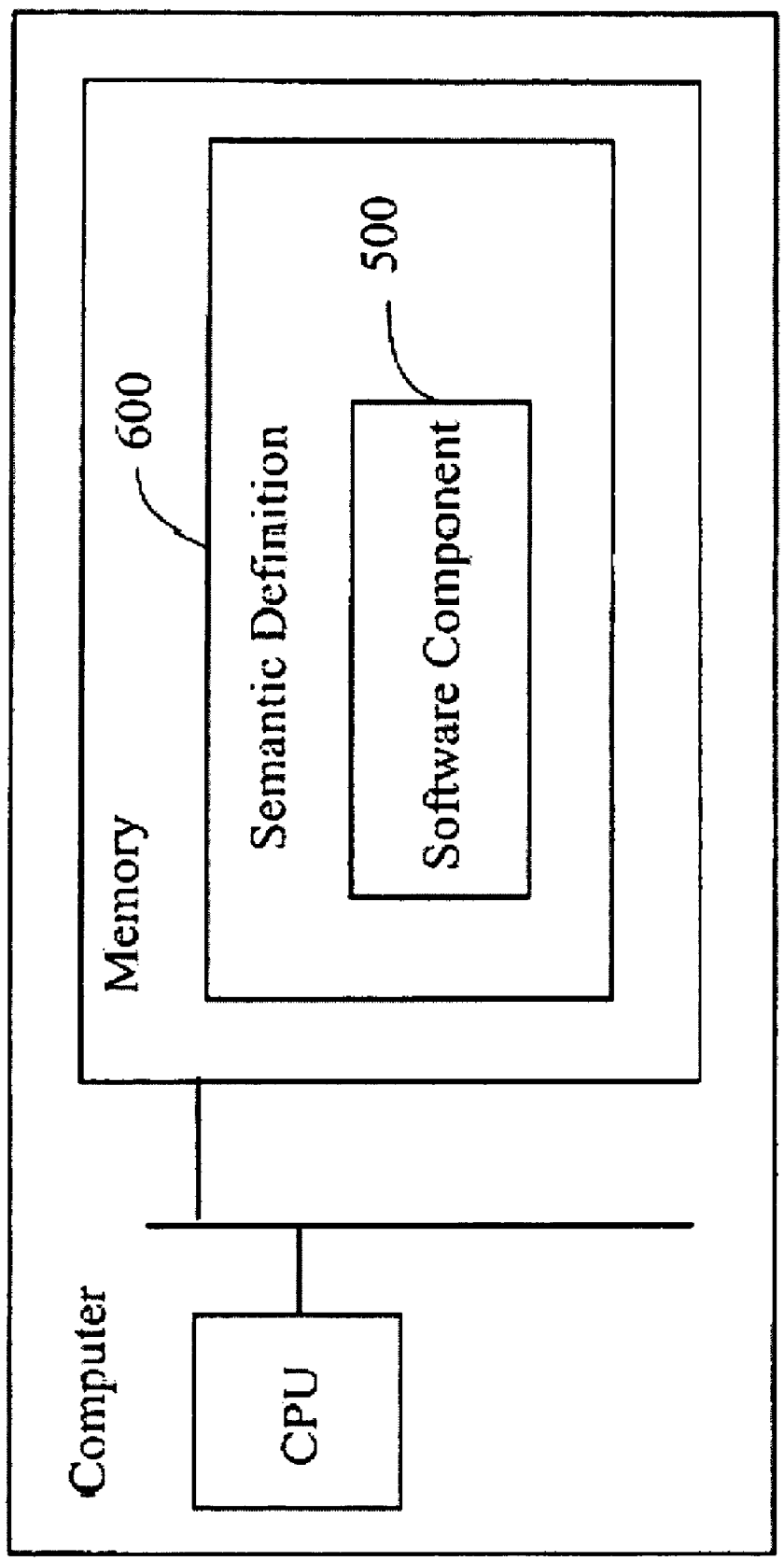
FIG. 6. is a block diagram of a computer system incorporating an embodiment of a Semantic Definition.
Figure 7:
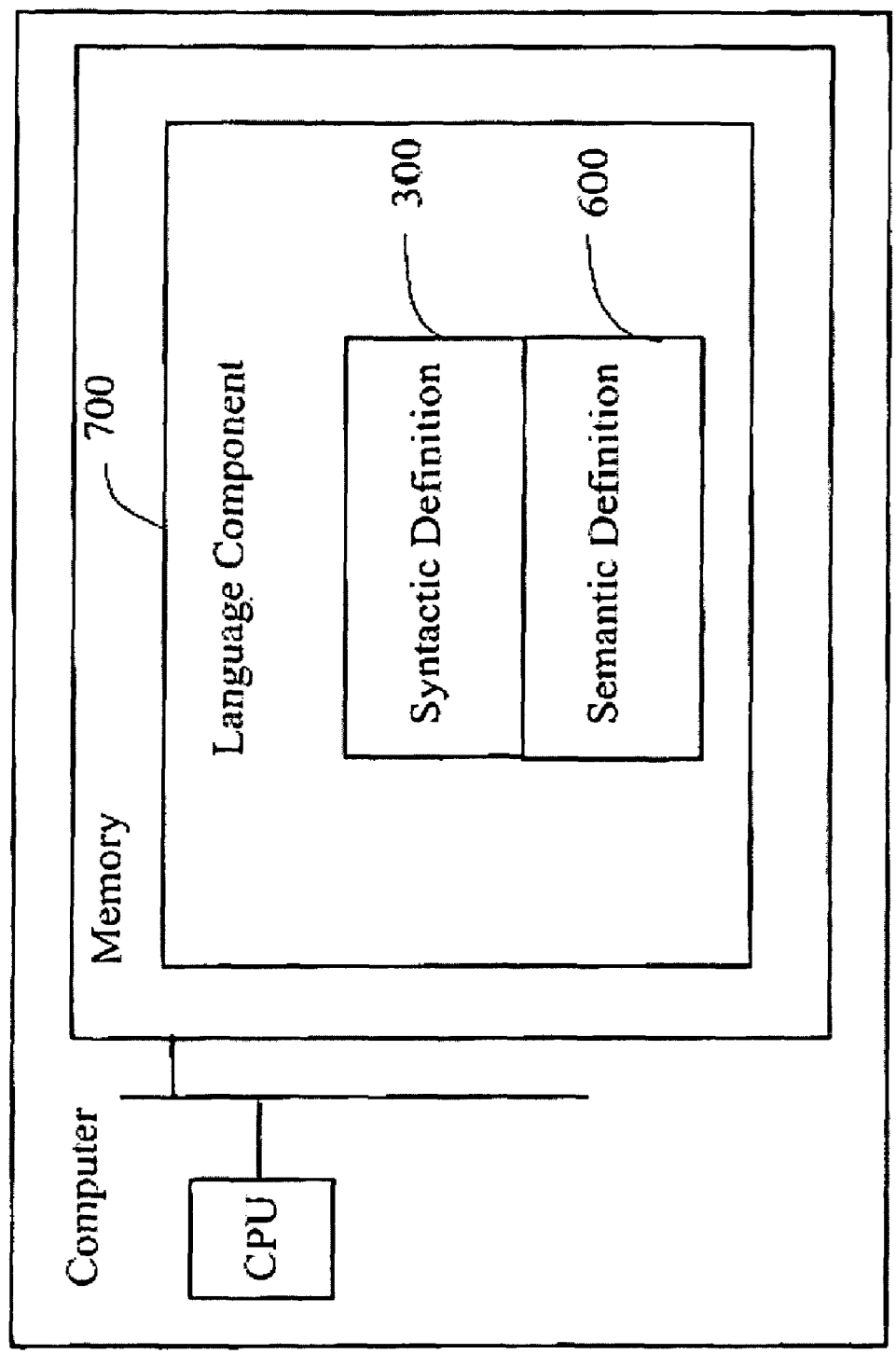
FIG. 7. is a block diagram of a computer system incorporating an embodiment of a Language Component.

The term software component is defined for the purposes of the embodiment presented here as a segment of discrete code that performs a function and that is normally distributed as a separate unit to enable greater reuse. JavaBeans, COM components, Syms, methods, objects, and CORBA components are all examples of software components. One embodiment of a software component can be seen in FIG. 5.

Figure 1:
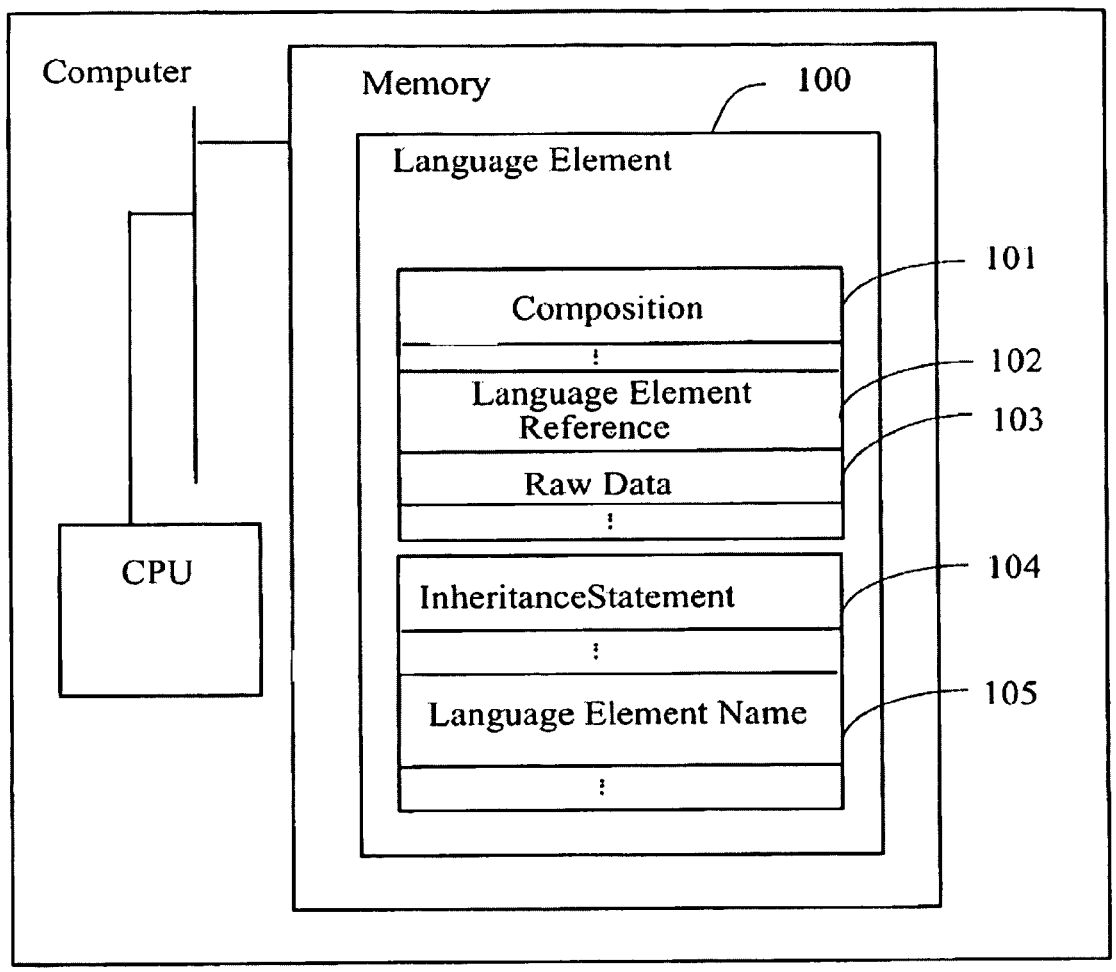
FIG. 1 is a block diagram of a computer system incorporating an embodiment of a Language Element.

The term language element is defined for the purposes of the embodiment presented here as an element that is part of the grammar of a language. In some implementations, language elements can inherit from each other. In other implementations, language elements can not inherit from each other. In most implementations, language elements are defined in terms of other language elements and raw data. One embodiment of a language element can be seen in FIG. 1.

The term semantic relationship is defined for the purposes of the embodiment presented here as the meaning of the syntactic relationships in a program. For example, in a calculus program, the semantic relationships would define the meaning of different combinations of numbers and mathematical operators.

The term syntactic appearances is defined for the purposes of the embodiment presented here as the raw data and syntactic appearances directly associated with a component in a language or a set of descriptions expressed as raw data and syntactic appearances that specify the component. For example, the syntactic appearance of a specific atom like the Hydrogen component, without any accompanying descriptions, would be "H" in a chemistry component language since this would be the raw data directly associated with the Hydrogen component. Alternatively, it could be the text "the atom with one proton" since this specifies the Hydrogen component even though it does not directly reference it by name.

The term syntactic relationship is defined for the purposes of the embodiment presented here as the legal ways that programming elements can be related to each other. For example, in a calculus program, the syntactic relationships would define the legal ways that numbers and mathematical operators could be combined.

Architecture. In one embodiment, the invention is implemented through Language Components (700), a Dependency Analyzer (900), a Request Creator (1200), a Download Manager (1201), and a Request Broker (1300). The Language Components (700) create the Associations (400) between Language Elements (100) and Software Components (500). The Dependency Analyzer (900), in turn, determines information about missing dependencies. The Request Creator (1200) then uses this information to construct a request that is sent to the Request Broker (1300) via the Download Manager (1201). Finally, the Request Broker (1300) determines if the missing dependency exists on the remote system and, if it does, sends the Language Component (700) to the program that made the request.

In this embodiment, the Language Element (100), the Association (400), and the Software Component (500) are merged together into a single programming unit called the Language Component (700). The Language Element (100) of the resulting programming unit defines the syntactic appearances of the Language Component (700) in the language. The Software Component (500), in turn, defines the meaning of those syntactic appearances. In this way, if syntactic appearances are unrecognized or a missing dependency is described by a set of syntactic appearances, the syntactic appearances of the Component Language (800) can be used to enable an automatic discovery of the Language Component (700).

This cohesion between syntactic and semantic relationships is used by the Dependency Analyzer (900) to determine missing dependencies. The Dependency Analyzer (900) locates both syntactic appearances that are unrecognized and syntactic appearances that reference a dependency that is not on the local computer. In the first case, the SkipAhead Parser (902) is used to determine the syntactic appearances that are unrecognized. These syntactic appearances are then saved in the First Failure Record (901) that is used to construct a request for the missing dependencies. In the second case, the Dependency Analyzer (900) determines that a missing dependency exist when a description of a component does not exist on the local computer and stores information about the missing dependency in the Second Failure Record (1000).

The Request Creator (1200) then uses the collected information to construct a request for the missing dependencies. In instances where one or more syntactic appearances were unrecognized, the Request Creator (1200) is used to automatically construct a request of the missing dependency based on the unrecognized syntactic appearances and the types of the Language Components (700) that normally describe syntax at that point in the language. In instances where all of the syntactic appearances are recognized by Language Component's (700) on the client's system, but they describe a Language Component (700) that is not present on the system, the Request Creator (1200) constructs a request based on the set of syntactic appearances that describe the component.

After the request is constructed, it is sent over a network to a Request Broker (1300) that serves as a repository of Language Components (700). In the first method, after the Request Broker (1300) receives a request for a Language Component (700), it uses the unrecognized syntactic appearance and the types of Language Components (700) that were passed to locate the missing dependency. In the second method, the Request Broker (1300) searches for all instances of components that match the description that it received. On successfully determining a Language Component (700) that fulfills a request, the Request Broker (1300) returns the Language Component (700) to the client.

In this way, the present embodiment enables the automatic determination, search, and discovery of Software Components (500). In the following sections, we describe the present invention in more detail and reference the drawings that are included with this embodiment.

An Embodiment of Language Components. In one embodiment, the Language Component (700) is a Sym, as described in the patent filing "A Method and System For Creating Software Programs by Coupling Syntactic and Semantic Relationships" (Ser. No. 10/060,433) which is hereby incorporated by reference. Syms enable more scalable software programs through the cohesion of syntactic and semantic relationships. This cohesion enables the inheritance and polymorphism of data, methods, and relationships, increasing the reusability of software as a whole. A Sym defines the set of syntactic appearances that are associated with a Language Component (700) in its Self-Description and the semantics or meaning of those syntactic appearances in its Definition. In this way, the syntactic appearances of a Sym in a Component Language (800) are cohered with the code that defines those appearances.

In another embodiment, the Language Component (700) is modeled after the Sym and coheres Software Components (500) and Language Elements (100). Each Language Element (100) is a piece of grammar that is a Composition (101) of other Language Element References (102) and Raw Data (103). The Language Elements (100) inherit from each other through the use of an Inheritance Statement (104) that contains a Language Element Name (105). A Computer Language (200) is defined as a collection of Language Elements (100). In addition to this embodiment, those familiar with the state of the art know that there are almost an endless number of different ways to define language elements from monads to the definitions in BNF and EBNF grammars. All of these methods are equivalent for the purposes of this invention.

Each Software Component (500) is a unit of Discrete Code (501). Software Components (500) in most implementations can inherit from each other and a collection of Software Components (500) can define a program or the meaning of a Computer Language (200). In addition to the embodiment presented here, those familiar with the state of the art know that there are a large number of software component models to choose from that, for the purposes of this invention, are equivalent.

The Language Component (700) in this alternative embodiment is composed of a cohered Semantic Definition (600) and Syntactic Definition (300). The Semantic Definition (600) defines the meaning of the Syntactic Definition (300) and is itself composed of a Software Component (500) containing Discrete Code (501). The Syntactic Definition (300), in turn, is composed of a Language Element (100) that defines part of a Computer Language (200) and the Component Associations (301) that connect Associations (400) to the Software Component (500). In this way, it is possible to build a Component Language (800) in which each Language Element (100) is cohered with one or more Software Components (500) in a Language Component (700). In this embodiment, when the Software Component (500) and the Language Element (100) are combined into a Language Component (700), the resulting programming unit is then restricted to inheriting from only one Language Component (700), extending the cohesion to attributes, behavior, relationships, and type.

An Embodiment of the Dependency Analyzer. In one embodiment, the Dependency Analyzer (900) is used to collect information on missing dependencies. The Dependency Analyzer (900) locates both unrecognized syntactic appearances and syntactic appearances that reference a dependency that is not on the local computer. An example of the first case is if the syntactic appearance "H" appears within the context of a chemistry Component Language (800). The Dependency Analyzer (900), in this case, would determine that an Atom with the syntactic appearance "H" was the missing dependency. An example of the second case is the description "an atom with one proton" also within the context of a chemistry Component Language (800). In this case, the Dependency Analyzer (900) would determine that it was missing the dependency described by the text.

In the first case, during the process of matching Language Components (700) against data, the Dependency Analyzer (900) keeps a record of all of the Language Components (700) that fail to match in the First Failure Record (901). If the entire match fails, the Dependency Analyzer (900) then rewinds the match attempt to the last Matcher Failure (1100) and uses the SkipAhead Parser (902) to iteratively skip ahead data elements until a match is successful. If that fails, it rewinds to the next Matcher Failure (1100) and repeats the process. If none of the entries in the First Failure Record (1100) succeed using the SkipAhead Parser (902), the entire match fails. Otherwise, in the cases where the match succeeds using the SkipAhead Parser (902), the types of the Language Components (700) that normally match at that point in the language and the unmatched data are stored in the Second Failure Record (1000).

In the second case, as Language Components (700) are instantiated, the Dependency Analyzer (900) provides a service that allows the Language Components (700) that are instantiated to pass it a description of Language Components (700) that are needed in order to complete their execution. This generalized approach allows different Component Languages (800) to define descriptions of Language Components (700) in different ways. When a description of a Language Component (700) can not be satisfied by any of the Language Components (700) on the local computer, the syntactic appearances that describes the missing dependency is saved in the Second Failure Record (1000) as a Description (1001).

An Embodiment of the SkipAhead Parser. The SkipAhead Parser (902) works by saving the names of Language Elements (100) that failed to match with the position they failed to match at while parsing data. The name of the Language Element that failed to match is stored as a Failure Name (1101) and the position is stored as the Failure Position (1102) in the Matcher Failure (1100). The collection of Matcher Failures (1100) in a match are stored in the First Failure Record (901). If the parse is unsuccessful, the SkipAhead Parser (902) can return to the most recent and most specific Matcher Failure (1100) and skip elements of data until the match succeeds or fails. If the match does succeed after this process, then the elements of data that were skipped may be able to be matched by a Language Element (100) of the same type of Language Element (100) that normally matches there that is not on the local system. If no such Language Element (100) can be found locally or remotely, then the SkipAhead Parser (902) can rewind back to the previous Matcher Failure (1100) and skip elements again until the match succeeds or fails. In this way, a SkipAhead Parser (902) can determine what parts of a language are unrecognized on a local system and collect the information necessary for locating them.

As an example of a SkipAhead Parser (902) in action, consider a complex mathematical statement. If a SkipAhead Parser (902) was parsing the statement "1+i+2" and the Language Element (100) for the imaginary number ("i") was unknown to the system then it would fail on the data "i". The SkipAhead Parser (902) would then return to the position where it failed to match "i" and would skip ahead one character and try to finish the match. In this case, the match would succeed and the data "i" and the Language Element (100) type of "Number" could then be stored in the system. This information could then be used to locate a Language Element (100) that inherited from "Number" and matched the data "i". In the language of mathematics, the only number that meets this criteria is the imaginary number. In this way, the SkipAhead Parser (902) will have determined enough information to find the missing Language Component (700) and, in the present invention, the Software Component (500) that was associated with it that defines the meaning of imaginary numbers.

Those familiar in the state of the art know that there are many equivalent methods for implementing a SkipAhead Parser (902). One of the simplest is to create a standard non-recursive parser that saves its state every time it fails to match a Language Element (100). This trivial modification would allow a programmer to easily recover the data position of the failure and the name of the Language Element (100) that failed to match. The programmer could then increment the data position in the state by a constant and resume the match using the saved state. Other methods include creating a parse tree that saves failed matches as nodes in the tree, simulating state in a recursive parser so that a match can be resumed by simulating the matching that came before a failure, and resuming a match from the beginning with an interrupt when it encounters the failed Language Element (100) and the data position again. These methods and all others are equivalent for the purposes of the present invention.

An Embodiment of a Request Creator. In one embodiment, the Request Creator (1200) repeatedly tries to download the missing dependencies by looking in the Second Failure Record (1000) and the First Failure Record (901). The Request Creator (1200) accomplishes this by creating one of two types of requests depending on whether the missing dependency is located in the First Failure Record (901) or the Second Failure Record (1000). The first type of request is created when the Request Creator (1200) receives the name of the Language Component (700) that failed to match with the unrecognized syntactic appearances and creates a request from these two pieces of data. The second type of request is created when the Request Creator (1200) receives a set of syntactic appearances that describes a Language Component (700). If the request sent from the Request Creator (1200) is not successful and the Software Component (500) is not found, the next entry in the Second Failure Record (1000) is successively tried until the Software Component (500) is located or the search fails. If the Language Component (700) is successfully found, it can then be successfully downloaded and compiled.

An Embodiment of a Download Manager. In one embodiment, the Download Manager (1201) contains a list of nodes known as a Node List (1202) from which it is possible to download Language Components (700). The Download Manager (1201) on receiving a request from the Request Creator (1200) successively tries to make the request to different nodes until it is successful. On failing to download the missing dependency from any of the nodes, the Download Manager (1201) returns failure, otherwise it returns success.

In another implementation, rather than containing a list of nodes, the Download Manager (1201) contains the name of a central server to download Language Components (700) from. In other implementations, the Download Manager (1201) is replaced with a reference manager that, instead of downloading the Language Component (700), references an instance of it across the network. In this way, the present invention is independent of both network technology and topology.

An Embodiment of a Request Broker. In one embodiment, the Request Broker (1300) uses the Request Parser (1301) to parse the request and determines what type of request it is.

If the request contains the name of the Language Component (700) and the syntactic appearances that failed to match, the Request Broker (1300) then locates the Child List (1302) of that component. Then, for each Child Description (1400), the Request Broker (1300) loads the Syntactic Definition (300) and the Component Name (1401) and uses the SkipAhead Parser (902) to see if it successfully matches the data. If it succeeds, the name of the Language Component (700) whose Syntactic Definition (300) successfully matched is passed to the Response Creator (1303). The Response Creator (1303) then sends that Language Component (700) to the program that requested it.

If the request contains a description of a Language Component (700), the Request Broker (1300) uses the type of the Language Component (700) that is described to locate the Child List (1302) for that type of Language Component (700). Then, for each Child Description (1400) in the Child List (1302), the component is loaded using the Component Name (1401) and the attributes and behaviors expressed in the description are checked to see if they match. Since these attributes and behaviors are described in a Component Language (800), the names used to describe them are also guaranteed to correspond to the names used in the Language Component (700). If the attributes and behaviors match, the name of the Language Component (700) is passed to the Response Creator (1303). The Response Creator (1303) then sends the Language Component (700) across the network to the program that requested it.

If the Language Component (700) is not found, the Response Creator (1303) sends a message denoting a failure to find the Language Component (700).

Embodiments with Interactive User Systems. In one set of alternative embodiments, a user provides input to an interactive system and, on encountering user input that the system does not recognize, the present invention is used to automatically download or reference the missing dependencies across a network. In one alternative embodiment a user interactively types or speaks a request to the computer system and, if the system fails to understand the input, the present invention is used to download or reference the missing dependencies associated with the user's input.

Embodiments with Alternative Linguistic Programming Units. In one set of alternative embodiments, the Sym is replaced with an alternative linguistic programming unit. For example, in one alternative embodiment using a linguistic programming unit, Syms are replaced with monadic combinators, a programming unit commonly used in functional programming languages.

Embodiments with Other Component Models. In another alternative embodiment, the wiring technology of a component framework is coupled with the present invention to create a complete solution in which the present invention discovers components using the communication protocol. In this way, legacy software using existing component technologies like CORBA, SOAP, and J2EE can be improved with the present invention.

Embodiments with Programming Languages and Parsers. In another alternative embodiment, the present invention is implemented in a programming language with the help of a parser. Tokens and higher-level language elements that the parser matches are associated with programming units. On encountering unknown tokens, the alternative embodiment can search for the missing component by specifying the type of the component that is normally matched there and the tokens that could not be matched.

Alternative Embodiments. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and various embodiments with various modifications as are suited to the particular use contemplated. It is intended that the scope of the invention be defined by the claims appended hereto and their equivalents.

What is claimed is:

1. A system for self-assembling software components, the system comprising:
a processor;
a memory coupled to the processor;
a first and second set of language components executed in the memory by the processor, wherein each language component defines at least one part of at least one language runnable on a computer by associating a piece of grammar of the at least one language with at least one software component that implements the piece of grammar;
a request broker executed in the memory by the processor that upon being provided with at least one section of code written in the at least one language matches syntactic appearances of the first set of language components in the at least one section of code; and
logic executed in the memory by the processor to grant access to the language components of the first set whose syntactic appearances the request broker matched, in order to enable self-assemblage of the language components of the first set with language components of the second set.

2. The system of claim 1 wherein the matching language components implement a subset of the at least one language used by the at least one section of code and are self-assembled with language components of the second set.

3. The system of claim 1 wherein the at least one section of code describes at least one requested language component and the matching language components of the first set enable access to be granted to the at least one requested language component.

4. The system of claim 1 wherein the request broker receives a set of allowed types of language components.

5. The system of claim 1 wherein a computer on a network self-assembles the language components from other computers on the network as needed.

6. The system of claim 1 wherein the language components of the first set are coupled with at least one different component technology and self-assemblage with the second set of language components occurs through a communication protocol of the at least one different component technology.

7. The system of claim 1 wherein the request broker finds only a subset of the language components of the first set that implement the at least one section of code written in the at least one language and access is granted to that subset.

8. The system of claim 1 wherein each language component comprises a description of legal ways that a collection of language components and/or tokens are related to each other and at least one software component that implements what those relationships mean.

9. The system of claim 1 wherein the at least one language is a formal and/or natural language.

10. A system for self-assembling software components, the system comprising:
- a processor;
- a memory coupled to the processor;
- a set of language components executed in the memory by the processor that each defines at least one part of at least one language runnable on a computer by associating a piece of grammar of the at least one language with at least one software component that implements the piece of grammar;
- a dependency analyzer executed in the memory by the processor that attempts to run the set of language components against at least one section of code and discovers from at least one unrecognized syntactic appearance that at least one language component needed to run the at least one section of code is not available;
- a first processing unit to provide the at least one section of the code to request access to the at least one language component that the dependency analyzer discovered;
- a second processing unit to access and/or receive the at least one requested language component in view of the at least one section of the code; and
- a third processing unit to perform a self-assemble of the first set of language components with the received at least one language component.

11. The system of claim 10 wherein the dependency analyzer fails to match the at least one section of the code, and the at least one requested language component implements a subset of the at least one language used by the at least one section of code.

12. The system of claim 10 wherein the at least one requested language component is described by the at least one section of code.

13. The system of claim 10 wherein the dependency analyzer sends a set of allowed types of the at least one requested language component.

14. The system of claim 10 wherein the at least one requested language component is coupled with at least one different component technology and self-assemblage with the set of language components occurs through a communication protocol of the at least one different component technology.

15. The system of claim 10 wherein a computer on a network comprising the dependency analyzer self-assembles the at least one requested language component from at least one other computer on the network.

16. The system of claim 10 wherein each language component comprises a description of legal ways that a collection of language components and/or tokens are related to each other and at least one software component that implements what those relationships mean.

17. The system of claim 10 wherein the at least one requested language component is automatically used to run the at least one section of code upon access being granted.

18. The system of claim 10 further comprising an interactive system wherein the at least one section of code is unrecognized user input.

19. The system of claim 10 wherein the at least one language is a formal and/or natural language.

\* \* \* \* \*